United States Patent
Assouad

[19]

[11] Patent Number: 5,963,386
[45] Date of Patent: Oct. 5, 1999

[54] DISK RESIDENT SPLIT DATA SECTOR INFORMATION MANAGEMENT SYSTEM ON A HEADERLESS MAGNETIC DISK DEVICE

[75] Inventor: Nicolas C. Assouad, Niwot, Colo.

[73] Assignee: STMicroelectronics N.V., Netherlands

[21] Appl. No.: 08/829,431

[22] Filed: Mar. 31, 1997

[51] Int. Cl.$^6$ ............................... G11B 5/09; G11B 5/596
[52] U.S. Cl. ........................ 360/48; 360/53; 360/77.08
[58] Field of Search .............................. 360/46, 48, 51, 360/53, 77.08

[56] References Cited

U.S. PATENT DOCUMENTS

| | | | |
|---|---|---|---|
| 5,422,763 | 6/1995 | Harris .................................. | 360/51 |
| 5,523,903 | 6/1996 | Hetzler et al. ......................... | 360/48 |
| 5,740,358 | 4/1998 | Geldman et al. ....................... | 360/53 |
| 5,754,351 | 5/1998 | Kuen et al. ............................ | 360/48 |
| 5,802,584 | 9/1998 | Kool et al. ............................. | 360/48 |

*Primary Examiner*—Aristotelis M. Psitos
*Assistant Examiner*—Regina Y. Neal
*Attorney, Agent, or Firm*—Theodore E. Galanthay; Lisa K. Jorgenson; William J. Kubida

[57] ABSTRACT

A disk resident system for managing split data sector information in a headerless format magnetic disk device. The split data sector information is stored in a split data sector information field that is recorded in available areas within a headerless disk format such as the gaps within the headerless disk format or in available space within disk administration fields. Preferred areas within a headerless disk format include the gap immediate preceding a servo burst, the gap immediately following a servo burst, or within the servo burst itself, so that the split data sector information is readily available at the time the servo burst is read and interpreted. Information in a split data sector information field can include various combinations of the number of bytes in a split data sector segment that follows a first servo burst, the number of fixed length full data sectors between the first servo burst and an adjacent second servo burst, and the number of bytes in a split data sector segment that follows the second servo burst. Any split data sector information not expressly represented in a split data sector information field can be calculated because the number of bytes between a pair of adjacent servo bursts is known. Overlapping split data sector information in successive split data sector information fields can be used for look-ahead purposes or data integrity purposes. A split data sector information field can also be accompanied by an ECC type field for data integrity check purposes.

23 Claims, 3 Drawing Sheets

DISK RESIDENT SPLIT DATA SECTOR INFORMATION MANAGEMENT SYSTEM ON A HEADERLESS MAGNETIC DISK DEVICE

FIELD OF THE INVENTION

This invention relates to the field of magnetic disk device formats, and in particular to a disk resident system for managing split data sector information in a split data sector information field of headerless format magnetic disk device.

PROBLEM

A specific point on the concentric tracks of a magnetic disk is identified by a unique address that typically includes a cylinder number, a head number, and data sector number. To help position a read/write head over a specific point on the magnetic disk, special markers called servo bursts are located at regularly spaced intervals throughout the recording surface of the magnetic disk. The servo bursts each contain a cylinder, head, and servo burst number that are used to orient the read/write heads so that a target address on the magnetic disk can be located. The cylinder and head portion of a target address identify a specific track on the magnetic disk and the data sector portion of a target address identifies a specific data sector on the track. Because there are a fixed number of bytes in a data sector and there are a fixed number of bytes between servo bursts on a given track, the exact location of a target data sector can be calculated once the track is located.

One problem with calculating the exact location of a target data sector that is located between two neighboring servo bursts is that the fixed length data sectors do not always fit evenly between the boundaries of two neighboring servo bursts. The result is a data sector that is split across a servo burst so that there are some number of bytes of the split data sector located on a first side of the servo burst and the remaining number of bytes are located on a second side of the servo burst. Thus, to calculate the precise location of a target data sector boundary it is necessary to know if a split data sector exists at a given servo burst boundary, and if so how many bytes of the split data sector exist following the servo burst boundary but before the first full data sector following the servo burst boundary.

In historic magnetic disk devices that included headers in their disk format, split data sector information was generated and stored in the headers on the disk where the information was readily available during read/write operations. Today, in existing magnetic disk devices that have eliminated headers from the disk format, split data sector information is generated and stored in Random Access Memory (RAM) tables that are managed by the disk control components. However, the split data sector information in the RAM tables is often subject to problems that include, but are not limited to, corruption of the data in the tables, performance overhead and additional electronics requirements to ensure data integrity, and inefficient table searching schemes to retrieve split data sector information from the tables. Thus, data access times can be adversely affected, for example, if an extra revolution of the disk results due to the inability to retrieve the split data sector information from the RAM tables quickly enough.

For these reasons there is a need for split data sector information that is resident on the disk itself in a headerless disk format magnetic disk device. A solution to this problem as disclosed and claimed herein has heretofore not been known prior to the present invention.

SOLUTION

The above identified problems are solved and an advancement achieved in the field due to the disk resident split data sector management system of the present invention. The split data sector information management system includes a disk resident split data sector information field on a magnetic disk device that has a headerless disk format. The split data sector information field contains data that is indicative of at least one segment of at least one data sector that resides between a first servo burst and an adjacent second servo burst. The data that is indicative of at least one segment of at least one data sector that resides between a first servo burst and an adjacent second servo burst can include, but is not limited to or required to include, the number of bytes in a first split sector segment that follows a first servo burst, a number of full data sectors that fit between the first servo burst and the adjacent second servo burst, and a number of bytes in a second split sector segment that precedes the second servo burst. Any of the three pieces of split data sector information that are not included in the split data sector information field can be calculated from the split data sector information that is available from the split data sector information field.

The split data sector information field can be recorded in any available area in the headerless disk format such as a gap in the headerless disk format. One example of a gap in the headerless disk format is the gap immediately preceding a servo burst or the gap immediately following a servo burst. Alternatively, the split data sector information field can be recorded in an existing disk administration field such as a reserve area in a disk administration field. One example of a disk administration field includes, but is not limited to, a servo burst. Storing the split data sector information within or near each servo burst is preferred because the split data sector information is then readily available at the time the servo burst information is read and interpreted.

The split data sector information field can also include an Error Correction Code (ECC) to assist in verifying the validity of the split data sector information field's contents. Neighboring split data sector information fields can also contain overlapping split data sector information for look-ahead purposes and/or data integrity check purposes by comparing overlapping split data sector information.

DETAILED DESCRIPTION

Figure 1:
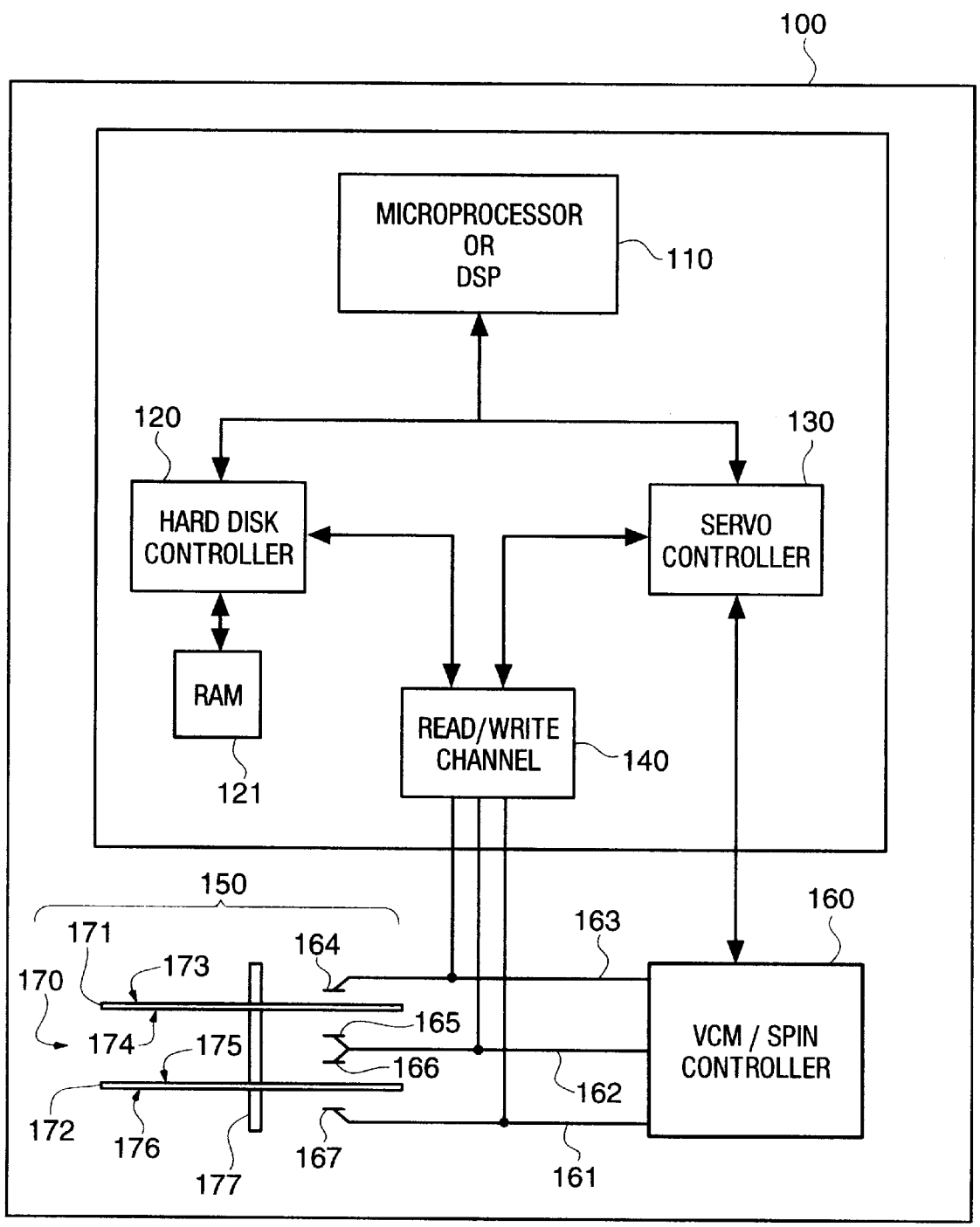
FIG. 1 illustrates a system level view of a magnetic disk device component architecture in block diagram form.

Magnetic Disk Device Architecture—FIG. 1

FIG. 1 illustrates a system level architecture view of a magnetic disk device 100 in block diagram form. The primary components in magnetic disk device 100 include, but are not limited to, disk control components 110–140 and operational disk components 150–160. Disk control components 110–140 include, but are not limited to, a microprocessor or Digital Signal Processor (DSP) 110, a hard disk controller 120 with accompanying RAM 121, a servo controller 130, and a read/write channel controller 140. The microprocessor or DSP 110 is the highest level of control and coordination for all disk device activities and read/write operations executed by the disk control components. Hard disk controller 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo burst information and controls positioning activities of read/write heads. Read/write channel 140 passes data to and from the various disk control components 110–130 for each read/write operation.

Operational disk components 150–160 include, but are not limited to, a Head and Disk Assembly (HDA) 150 that includes magnetic disk 170 and read/write heads 164–167, and Voice Coil Motor (VCM)/spin controller 160 that is operatively connected to access arms 161–163. Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. Read/write heads 164–167 are positioned to fly just off the recording surfaces 173–176 respectively when the magnetic disk 170 is spinning. Although other magnetic disk device architectures are possible other than the architecture described above, no limitation is intended or implied with respect to the present invention. The present invention is applicable to any headerless format magnetic or optical disk regardless of a single platter or multiple platter implementation or a removable medium or floppy disk medium.

Figure 2:
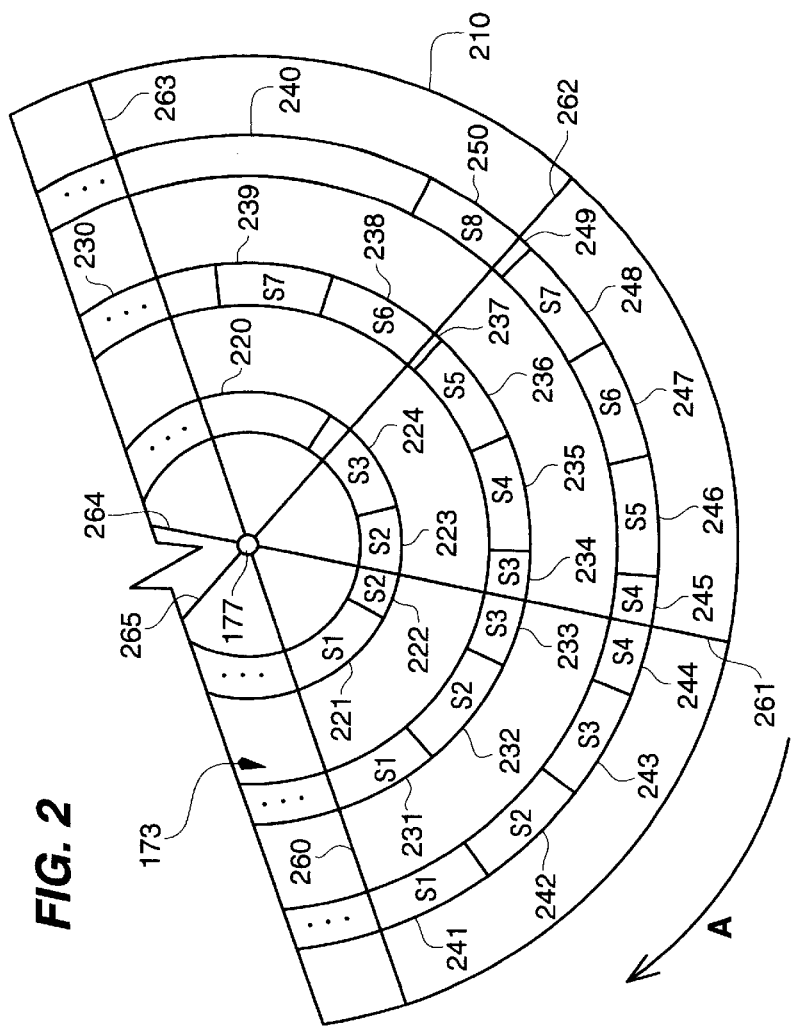
FIG. 2 illustrates an top view of a track and sector format on a magnetic disk device recording surface.

Magnetic Disk Format—FIG. 2

FIG. 2 illustrates the track and sector format for a recording surface such as recording surface 173 of magnetic disk 170. Recording surface 173 comprises a plurality of concentric tracks of successively increasing size from the center spindle 177 to the outer edge 210. The present illustration focuses on tracks 220, 230, and 240. A cylinder is the set of all tracks of a given size from each recording surface of each platter in magnetic disk 170. Thus, if track 230 is the 6th concentric track of recording surface 173 and each recording surface of magnetic disk 170 has a 6th concentric track, then there exists a 6th cylinder for magnetic disk 170 that comprises each 6th concentric track of each recording surface. With a single motion of access arms 161–163, each read/write head 164–167 can be simultaneously positioned to read and/or write data from any one or more of the recording surfaces 173–176 in cylinder 6. If track 230 is the 6th track and read/write heads 164–167 are numbered 00 through 03 respectively, then the cylinder CC and head HH address for track 230 on recording surface 173 would be "0600".

Each track on each recording surface such as recording surface 173 is overlaid with regularly spaced and radially aligned servo burst markings 260–265. Each servo burst that resides on each track contains, among other things, specific cylinder, head, and servo burst number information that uniquely identifies the location of each servo burst. For purposes of the present illustration, servo bursts 260–265 are numbered 0–5 respectively.

Data sectors, also known as sectors, blocks, or records, are fixed length addressable subdivisions of a track that typically contain customer data. For example, a typical sector size might be 512 bytes long. To simplify the discussion accompanying FIGS. 2–4, the data sectors 221, 231, and 241 are identified as sector number 1 and each begins on an even full sector boundary from servo burst 260. A given track, however, does not always begin with data sector number 1 at servo burst number 0 for reasons beyond the scope of this discussion.

Because the linear distance of track 240 is greater than the linear distance of track 220 and the data sectors are written and read from an outer track such as track 240 at a higher frequency than an inner track such as track 220, track 240 can contain more data sectors than track 220. For example, track 240 contains three full data sectors 241–243 and a split data sector segment 244 between servo burst 260 and servo burst 261, and track 230 contains only two full sectors 231–232 and a split data sector segment 233 between the same two servo bursts. In addition, the data sectors in tracks 230 and 240 that are split by servo burst 261 can have different numbers of bytes on either side of servo burst 261. For this reason, to calculate the precise location of a target data sector between two neighboring servo bursts 261 and 262 for example, the number of bytes in at least one of the split data sector segments 245 and 249 must be known.

Figure 3:
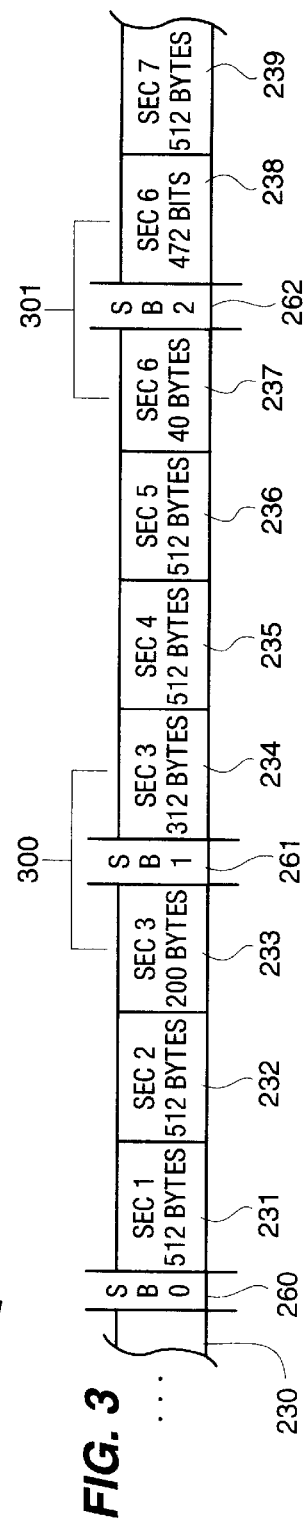
FIGS. 3–4 illustrate detailed views of a track and sector format in block diagram form.
Figure 4:
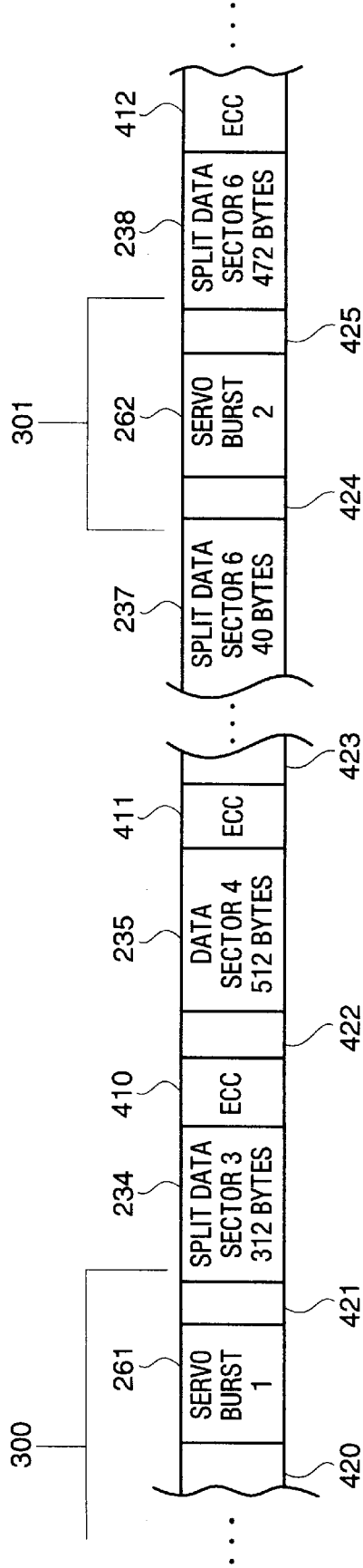
Figure 5:
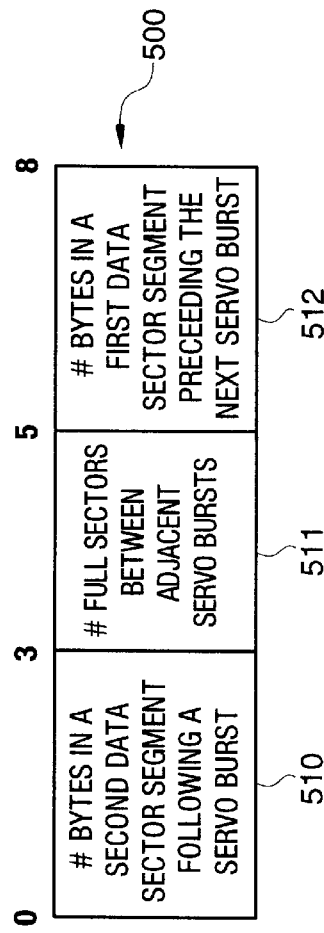
FIG. 5 illustrates a split sector information field in block diagram form.

Detailed Track and Sector Formats—FIGS. 3–5

FIGS. 3–5 illustrate successively detailed format views of a segment of track 230. FIG. 3 illustrates a segment of track 230 that includes servo bursts 260–262 and data sectors 231–239. Specifically, data sectors 231–232, 235–236, and 239 are shown as being full data sectors of 512 bytes each for example purposes. Split data sector 300 contains a leading or first data sector segment 233 having 200 bytes and a trailing or second data sector segment 234 having the remaining 312 bytes of an otherwise full 512 byte data sector. Similarly, split data sector 301 contains a leading or first data sector segment 237 having 40 bytes and a trailing or second data sector segment 238 having the remaining 472 bytes of an otherwise full 512 byte data sector.

FIG. 4 illustrates a further detailed view of a segment of track 230 that includes gaps 420–425 between fields in a headerless format. For example, servo burst 261 is preceded and followed by gaps 420 and 421 respectively. Gaps 420 and 421 are sufficiently wide to allow a read/write channel to switch between servo and data frequencies and to allow for spin variations of the disk itself. Similar gaps 424 and 425 exist around servo burst 262. Gaps 422 and 423 separate individual data sectors. ECC fields such as fields 410–412 always follow the last byte of a full data sector or the last byte of the second segment of a split data sector such as 234 and 238. For example, both split data sector segments 237 and 238 of split data sector 301 require only one ECC field.

FIG. 5 illustrates an example of a disk resident split data sector information field 500. The split data sector information field 500 contains data indicative of the data sectors of track 230 between servo burst 261 and 262 for example. In one embodiment, there are three fields 510–512 in a split data sector information field 500. A first field 510 can contain the number of bytes in a trailing or second split data sector segment that follows a first servo burst. A second field 511 can contain the number of full sectors that exist between neighboring or adjacent first and second servo bursts. A third field 512 can contain the number of bytes in a leading or first split data sector segment that precedes the second servo burst.

In another embodiment, the amount of information in a split data sector information field 500 can be minimized to contain only the first field 510 and third field 512. The number of fixed length full data sectors between adjacent servo bursts can be quickly calculated in the servo controller 130 or any other capable processor given that the number of bytes between adjacent servo bursts is known. The number of bytes between adjacent servo bursts is known because the distance between adjacent servo bursts is a known constant and the read/write frequency for a given track is known.

In another embodiment, the amount of information in a split data sector information field 500 can be further minimized to contain only the first field 510. The number of fixed length full data sectors and the number of remaining bytes between adjacent servo bursts can be quickly calculated as previously stated.

In another embodiment, the amount of information in a split data sector information field 500 can be minimized to contain only the last field 512. The number of fixed length full data sectors and the number of remaining bytes between adjacent servo bursts can be quickly calculated as previously stated.

In another embodiment, the information in a split data sector information field 500 can be configured to contain overlapping or look-ahead data sector information. For example, the split data sector information field 500 can include data for a first field 510 relating to the data sectors between a first servo burst and an adjacent second servo burst, and similar field 510 data relating to the data sectors between the second servo burst and an adjacent third servo burst. The number of fixed length full data sectors and the number of remaining bytes between adjacent servo bursts can quickly be calculated as previously disclosed. A subsequent split data sector information field 500 would contain overlapping information relating to the data sectors between the second and third servo bursts in addition to the third servo burst and an adjacent fourth servo burst. Not only does this overlap configuration facilitate a look-ahead capability, but the redundancy of overlapping split data sector information facilitates a data integrity check of successive split data sector information fields. Any other of a variety of combinations of look-ahead or overlapping split data sector information field configurations are considered within the scope of the present invention even though an exhaustive list of such variations is not expressly stated in this document.

In another embodiment, any one of the above identified split data sector information fields can be accompanied by its own ECC field or other error detection and correction field for data integrity verification.

Given the small amount of data in any one of the above disclosed embodiments, a split data sector information field 500 can be stored in many different places resident on a disk having a headerless disk format. In one embodiment the split data sector information field 500 can be stored in a gap such as gap 424 that immediately precedes a servo burst such as servo burst 262. In another embodiment the split data sector information field 500 can be stored in a gap such as gap 425 that immediately follows a servo burst such as servo burst 262. In another embodiment, split data sector information field 500 can be stored in available space within a disk administration field such as the reserve area of a servo burst itself. However, persons skilled in the art of magnetic disk device design have sharply differing views on the subject of whether such split sector information should be allowed in a servo burst or not. In a preferred embodiment the split data sector information field 500 is stored within or near a servo burst so that the split data sector information is readily available at the time the servo burst is read and interpreted.

SUMMARY

The present invention comprises a disk resident system for managing split data sector information in a headerless format magnetic disk device. The split data sector information is preferably stored within a servo burst or in one of the gaps that either precedes or follows a servo burst. The split data sector information itself can include a variety of combinations of data related to the data sectors between at least one pair of adjacent servo bursts. Any portion of split data sector information not expressly represented in a split data sector information field can be calculated because the number of bytes between a pair of adjacent servo bursts is known. Any overlapping split data sector information in successive split data sector information fields can be used for look-ahead purposes or data integrity purposes. A split data sector information field can also be accompanied by an ECC type field for data integrity check purposes.

Although specific embodiments are disclosed herein, it is expected that persons skilled in the art can and will make, use, and/or sell alternative disk resident split data sector information management systems for headerless disk formats that are within the scope of the following claims either literally or under the Doctrine of Equivalents.

What is claimed is:

1. A split data sector information management system for use in identifying a precise location of a target data sector in a disk having a headerless disk format, said system comprising:

a split data sector information field containing data indicative of at least one segment of at least one split data sector residing between a first servo burst and a second next adjacent servo burst;

means for writing said split data sector information field in an area of the disk proximate to the first servo burst and external to any data sector in said headerless disk format;

means for reading said split data sector information field from said area during a search for said target data sector;

in response to said means for reading, means for determining from said split data sector information field:

a number of bytes in a first split data sector segment immediately following said first servo burst;

a number of full byte data sectors between said first servo burst and said second servo burst; and a number of bytes in a second split data sector segment immediately preceding said second servo burst; and means for locating said target data sector in response to said means for determining.

2. A system according to claim 1 wherein said split data sector information field includes:

an error correction code for said split data sector information field.

3. A system according to claim 1 wherein:

said split data sector information field includes data indicative of at least one segment of at least one data sector residing between a first servo burst and a second servo burst and at least one segment of at least one data sector residing between said second servo burst and a third servo burst;

said means for determining includes:

a number of bytes in a first split data sector segment immediately following said first servo burst and a second split data sector segment immediately following said second servo burst;

a first number of full data sectors between said first servo burst and said second servo burst and a second number of full data sectors between said second servo burst and said third servo burst; and a number of bytes in a third split data sector segment immediately preceding said second servo burst and a fourth split data sector segment immediately preceding said third servo burst; and means for verifying validity of contents of a present split data sector information field against any overlapping contents of preceding split data sector information field previously read from said disk.

4. A system according to claim 1 wherein:

said split data sector information field only includes data indicative of a number of bytes of said at least one segment of said at least one data sector residing between said first servo burst and said second servo burst and no data indicative of a number of full data sectors between said first servo burst and said second servo burst; and said means for determining includes means for dynamically generating any split data sector information not present in said split data sector information field selected from at least one of a group comprised of: a number of said full data sectors between said first servo burst and said second servo burst, a number of bytes in a split data sector segment immediately following said first servo burst, and a number of bytes in a split data sector segment immediately preceding said second servo burst, in view of said data in said split data sector information field.

5. A system according to claim 1 wherein said area in said headerless disk format is a gap between fields in said headerless disk format.

6. A system according to claim 5 wherein said gap immediately precedes a servo burst.

7. A system according to claim 5 wherein said gap immediately follows a servo burst.

8. A system according to claim 1 wherein said area in said headerless disk format is a disk administration field.

9. A system according to claim 8 wherein said disk administration field is a servo burst.

10. A method for using split data sector information in a split data sector information field that is resident on a disk in a headerless disk format, said method comprising:

writing said split data sector information field in an area of the disk proximate to a servo burst and external to any data sector in said headerless disk format selected from at least one of a group comprised of: a gap immediately preceding a servo burst, a gap immediately following a servo burst, and within a servo burst;

reading said split data sector information field from said area during a search for a target data sector;

determining from said split data sector information field in response to said reading step:
a number of bytes in a first split data sector segment immediately following a first servo burst;
a number of full byte data sectors between said first servo burst and a second next adjacent servo burst; and
a number of bytes in a second split data sector segment immediately preceding said second servo burst; and locating said target data sector in response to said determining step.

11. A method according to claim 10 wherein said step of determining includes:

dynamically generating a number of full data sectors between said first servo burst and said second servo burst based on said number of bytes in said first split data sector segment immediately following said first servo burst and said number of bytes in said second split data sector segment immediately preceding said second servo burst.

12. A method according to claim 10 wherein said step of determining includes:

dynamically generating a number of full data sectors between said first servo burst and said second servo burst and a number of remainder bytes between said first servo burst and said second servo burst based on a number of bytes in a split data sector segment in said split data sector information field.

13. A method according to claim 10 including:

verifying split data sector information field integrity with an error correction code of said split data sector information field.

14. A method according to claim 10 including:

verifying split data sector information field integrity with redundant split data sector data among a plurality of split data sector information fields.

15. A split data sector information management system on a disk having a headerless disk format, said system comprising:

a split data sector information field containing data indicative of the size of at least one segment of at least one split data sector residing between a first servo burst and a next adjacent second servo burst; and means for recording said split data sector information in an area of the disk proximate to the first servo burst and external to any data sector in said headerless disk format.

16. A system according to claim 15 wherein said area is a gap in said headerless disk format.

17. A system according to claim 16 wherein said gap is selected from at least one of a group comprised of: a gap immediately preceding a servo burst field, and a gap immediately following a servo burst field.

18. A system according to claim 15 wherein said area is a disk administration field in said headerless disk format.

19. A system according to claim 18 wherein said disk administration field is a servo burst field.

20. A system according to claim 15 including:

means for reading said split data sector information field from said area in said headerless disk format; and means for determining a target data sector on said disk in view of said split data sector information in said split data sector information field.

21. A system according to claim 15 including:

means for reading said split data sector information field from said area in said headerless disk format;

means for determining from said data sector information field in response to said means for reading:
a number of bytes in a first split data sector segment immediately following said first servo burst;
a number of full data sectors between said first servo burst and said second servo burst; and a number of bytes in a second split data sector segment immediately preceding said second servo burst; and means for locating a target data sector in response to said means for determining.

22. A system according to claim 21 including:

means for verifying split data sector information field integrity.

23. A system according to claim 21 including:

means for verifying split data sector information field integrity of a first split data sector information field against any overlapping contents of a second split data sector information field previously read from said disk.

* * * * *